United States Patent
Müller et al.

(10) Patent No.: US 8,151,437 B2
(45) Date of Patent: Apr. 10, 2012

(54) DEVICE AND METHOD FOR GREEN MACHINING BEVEL GEARS

(75) Inventors: Hartmuth Müller, Remscheid (DE); Joachim Thomas, Haar (DE); Karl-Martin Ribbeck, Remscheid (DE); Burkhard Schneider, Hückeswagen (DE); Dietmar Loh, Kürten (DE)

(73) Assignee: Klingelnberg GmbH, Hückeswagen (DE)

( * ) Notice: Subject to any disclaimer, the term of this patent is extended or adjusted under 35 U.S.C. 154(b) by 1155 days.

(21) Appl. No.: 11/815,995

(22) PCT Filed: Feb. 14, 2005

(86) PCT No.: PCT/EP2005/001478
§ 371 (c)(1),
(2), (4) Date: Sep. 5, 2007

(87) PCT Pub. No.: WO2006/084481
PCT Pub. Date: Aug. 17, 2006

(65) Prior Publication Data
US 2008/0152446 A1    Jun. 26, 2008

(51) Int. Cl.
*B23P 23/00* (2006.01)
*B23P 15/14* (2006.01)
*B23Q 7/00* (2006.01)
*B23Q 7/04* (2006.01)
*B23Q 39/04* (2006.01)
*B23F 17/00* (2006.01)

(52) U.S. Cl. .......... 29/563; 29/893.35; 29/564; 29/56.5; 29/38 R; 409/6; 409/7; 409/27; 409/30; 409/53; 409/55

(58) Field of Classification Search ............... 409/6–7, 409/40, 54–55, 13, 27–30, 43–45, 53, 57, 409/25; 29/563, 893.3, 893.35, 893.36, 564, 29/56.5, 38 R, 27 C, 27 R
See application file for complete search history.

(56) References Cited

U.S. PATENT DOCUMENTS 906,189 A * 12/1908 Boisard ..................... 409/13
(Continued)

FOREIGN PATENT DOCUMENTS

| DE | 19904859 A1 | 8/2000 |
| DE | 19918289 A1 | 10/2000 |
| EP | 0832716 A2 | 1/1998 |
| JP | 11048078 | 2/1999 |

OTHER PUBLICATIONS

Machine Translation of DE 19904859, which DE '859 was published Aug. 2000.*

(Continued)

*Primary Examiner* — Erica E Cadugan
(74) *Attorney, Agent, or Firm* — McCormick, Paulding & Huber LLP

(57) ABSTRACT

The invention relates to a device for green machining bevel gears, including a CNC machining station for gear cutting a wheel blank (K2). The machining station includes a tool spindle which is used to receive a gear cutting tool and a work piece spindle which is used to receive the gear blank (K2). The machining station also relates to a machining station which operates in a vertical manner. The device also comprises a vertical processing station having a tool holder and a work piece spindle which is used to receive a work piece blank (K1). The machining station mechanically forms a functional unit together with the pre-machining station, wherein the work piece blank (K1) undergoes green machining in the pre-machining station, and is transferred as a gear blank (K2) to the first machining station after the first green machining where it is cut into a gear. The machining station and the pre-machining station are linked together in terms of data and control.

15 Claims, 4 Drawing Sheets

U.S. PATENT DOCUMENTS

| | | | | |
|---|---|---|---|---|
| 2,585,272 | A | * | 2/1952 | Praeg .............................. 409/6 |
| 4,597,155 | A | | 7/1986 | Garnett et al. |
| 7,461,441 | B2 | * | 12/2008 | Langerfeld .................. 29/56.5 |
| 8,006,359 | B2 | * | 8/2011 | Jaeger ......................... 29/38 B |
| 2003/0210964 | A1 | | 11/2003 | Fitzgerald et al. |
| 2004/0103519 | A1 | * | 6/2004 | Walz ............................. 29/563 |
| 2010/0111628 | A1 | * | 5/2010 | Megens et al. ................ 409/26 |

OTHER PUBLICATIONS

Suh et al., article titled "Sculptured Surface Machining of Spiral Bevel Gears with CNC Milling", from International Journal of Machine Tools & Manufacture, copyright 2001, pp. 833-850.*

International Search Report foe PCT/EP2005/001478.

\* cited by examiner

DEVICE AND METHOD FOR GREEN MACHINING BEVEL GEARS

CROSS REFERENCE TO RELATED APPLICATION

This application claims the benefit of PCT Application No. PCT/EP2005/001478, filed Feb. 14, 2005, the disclosure of which is herein incorporated by reference in its entirety.

BACKGROUND OF THE INVENTION

The present invention relates to devices for green machining bevel gears, in particular devices which are designed for dry machining. The present invention also relates to a corresponding method.

There are greatly varying machine tools which are used in the manufacture of bevel gears and similar gears. For some time, there has been a wish for automating the manufacture. One solution, which has only been able to succeed in a limited way up to this point, however, is a machining center which is designed so that a large number of manufacturing steps may be executed on the same machine tool. Such machine tools are not only very complex and therefore costly, but rather also require relatively great effort in the preparatory set up (equipping time). On the other hand, such machine tools, which have been developed in regard to high flexibility, are more suitable for producing individual fabrications or extremely small series.

A compact machine tool which is designed for turning and hobbing a workpiece is shown and described in European Patent EP 0 832 716 B1, this workpiece not having to be rechucked or transferred. In other words, the workpiece is seated on a main spindle after the chucking and is machined there using various tools. It is seen as a disadvantage of this machine tool that, because of the configuration of the various elements, it is not designed for the purpose of executing dry machining, because the removal of the hot chips is of special significance during dry machining. In addition, the movement clearance is restricted by the lateral configuration of the two carriages having the tools in relation to the workpiece. The machine tool shown is not capable of machining bevel gears, ring gears, or the like, but rather is conceived for machining spur gears.

A further machine tool is known from Published Application DE 199 18 289 A1, in which two steps are executed in sequence without having to rechuck the workpiece. The first step executed on this machine tool is rough machining of a spur gear using a hobbing cutter, to give the workpiece a coarse contour and surface. A fine machining method then follows, the workpiece also remaining in the same chucking for this purpose.

It is seen as a disadvantage of the machine tools which machine a workpiece in multiple steps without rechucking the workpiece that a large number of different parameters have to be taken into consideration in the design and implementation of the machine tool. A compromise must always be found between greatly varying goals, as is obvious from the following example. Both the roughing and also the fine machining are executed on the machine tool described in the published application cited at the beginning. Roughing is a method in which material is removed from a blank with high metal removing capacity. In contrast, very low feed and higher precision is used in fine machining. This results in different requirements solely in regard to the chucking. However, the type and configuration of the individual tools, as well as their activation, may also vary greatly. If one also wishes to perform a part or all of the cited steps as dry machining, further restrictions in regard to the configuration of the individual axes and tools result because of the special requirements in dry machining for the removal of the hot chips.

SUMMARY OF THE INVENTION

The present invention is based on the object of simplifying the manufacturing of bevel gears on one hand and accelerating it on the other hand, without having to accept quality losses.

A further object of the present invention is to provide a method and a corresponding device which are designed for dry machining.

These objects are achieved according to the present invention. One aspect of the invention comprises a device for use in the green machining of bevel gears, having a CNC-controlled machining station for gear cutting a gear blank. The machining station has a tool spindle for receiving a gear-cutting tool and a workpiece spindle for receiving the gear blank. The machining station is a vertically operating machining station, in which, during gear cutting, the workpiece spindle having the gear blank is situated below or above the tool spindle having the gear-cutting tool. The device additionally has at least one vertically operating pre-machining station having a tool holder and a workpiece spindle for receiving a workpiece blank. The machining station forms a mechanical functional unit together with the pre-machining station, in which the workpiece blank experiences green machining in the pre-machining station. Then the blank is transferred after the green machining as a gear blank to the machining station and then is cut into a gear. The machining station and the pre-machining station are linked to one another by control technology.

Another aspect of the invention comprises a method for green machining bevel gears, having the following steps:

(a) chucking a workpiece blank on a first workpiece spindle of a pre-machining station, (b) performing a first green machining of the workpiece blank using a tool, which is chucked in a first tool spindle of the pre-machining station to generate a gear blank from the workpiece blank, (c) automated transfer of the gear blank from the pre-machining station to a machining station, the gear blank being transferred from the first workpiece spindle to a second workpiece spindle of the machining station, (d) performing a second green machining of the gear blank using a tool, which is chucked in a second tool spindle of the machining station to generate teeth on the gear blank, the machining station and the pre-machining station being vertically operating stations and the machining station forming a mechanical functional unit together with the pre-machining station.

Further advantageous embodiments are also disclosed.

The method according to the present invention is especially designed for machining tooth flanks before a hardening process, i.e., in the green state. The tools which are used are to be selected accordingly.

BRIEF DESCRIPTION OF THE DRAWINGS

Exemplary embodiments of the present invention are described in greater detail in the following with reference to the drawings, in which:

FIG. 2A shows a schematic illustration of a first arrangement of a first device for use in the green machining of bevel gears, according to the present invention, while

FIG. 3A shows a schematic illustration of a first arrangement of a second device for use in the green machining of bevel gears, according to the present invention, while

DESCRIPTION OF THE PREFERRED EMBODIMENTS

Terms which are also used in relevant publications and patents are used in connection with the present description. However, it is to be noted that the use of these terms is solely for better understanding. The inventive ideas according to the present invention and the scope of protective of the patent claims are not to be restricted in their interpretation by the specific selection of the terms. The present invention may be transferred without further measures to other term systems and/or professional fields. The terms are to be applied accordingly in other professional fields.

The present invention is concerned with the machining of bevel gears. According to the definition, this term also comprises ring gears and bevel pinions. Bevel gears without axial offset and bevel gears with axial offset, i.e., so-called hypoid gears, are also included.

Figure 1:
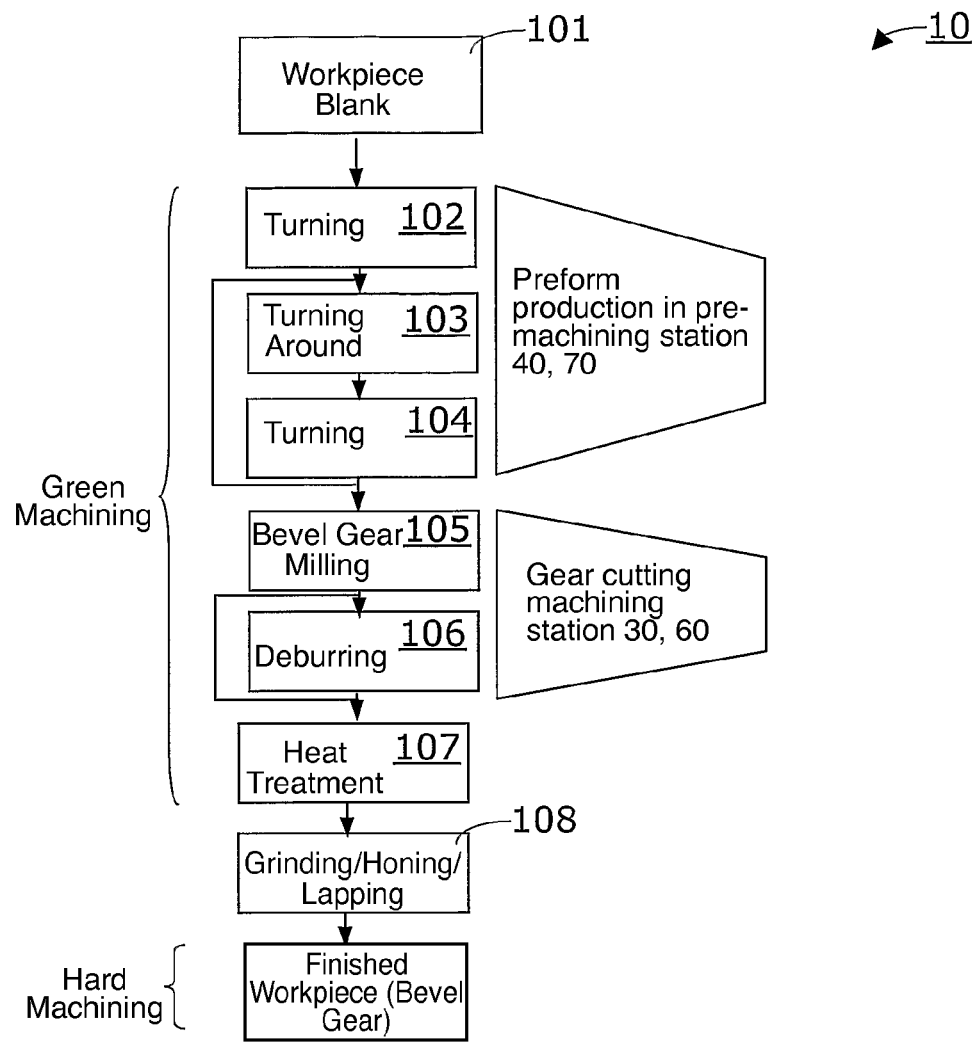
FIG. 1 is a schematic, exemplary illustration of the various machining steps in the gear cutting of bevel gears.

FIG. 1 shows a schematic illustration of an exemplary method sequence 10. The present invention may advantageously be used in the context shown. As noted, this is an example of the machining of a ring gear or bevel pinion. Starting from a workpiece blank (box 101), the following green machining steps are performed in the example shown. For example, a (central) hole may be generated by turning (box 102). The workpiece blank may then be turned around for further machining (box 103). After the turning around, renewed lathe machining may follow (box 104). These steps are optional and are referred to in the present context as preform production or pre-machining. Other steps or alternative steps may also be executed in the scope of the preform production. At the end of the preform production, the workpiece is referred to as a gear blank. Step 102 or steps 102-104 may be executed in a so-called pre-machining station 40 or 70.

The so-called gear cutting now follows. According to the present invention, preferably (dry) bevel gear cutters (box 105) are used to generate teeth on the gear blank. The optional step of deburring (box 106) then follows. Step 105 or steps 105-106 may be executed in a so-called machining station 30 or 60 according to the present invention. A further machining station may also be used.

Typically, heat treatment (box 107) to harden the wheel blank, and post machining or fine machining (box 108) subsequently follow. The bevel gear is then ready.

Further details of the present invention are described in the following on the basis of a more precise description of the individual method steps and using two exemplary embodiments, details of the individual embodiments being able to be exchanged or combined with one another.

The method according to the present invention for green machining bevel gears comprises the following steps. The reference signs relate to FIGS. 2 and 3. A workpiece blank K1 is chucked on a first workpiece spindle 42, 72 of a pre-machining station 40, 70. First machining of the workpiece blank K1 is performed using one or more tools 43, 73.1-73.5. The tool 43 or the tools 73.1-73.5 are chucked in a first tool spindle 41, 71 of the pre-machining station 40, 70. This first green machining includes one or more of the following machining steps: drilling, turning, milling, etc. The goal of this first green machining is to generate a gear blank K2 from the workpiece blank K1.

An automated transfer of the gear blank K2 from the pre-machining station 40, 70 to a machining station 30, 60 then occurs. The gear blank K2 is transferred from the first workpiece spindle 42, 72 to a second workpiece spindle 33, 63, which is part of the machining station 30, 60. This transfer may be performed by means which are integrated in the machining station 30, 60 and/or pre-machining station 40, 70, as described in connection with FIG. 3. External means may also be used for the transfer, however, as described in connection with FIG. 2.

The gear cutting is now performed in the machining station 30, 60. This occurs as follows. Second green machining of the gear blank K2 is performed using a tool 32, 62, which is chucked in a second tool spindle 31, 61 of the machining station 30, 60. The goal of this second green machining is to generate teeth on the gear blank K2. The second green machining preferably comprises the (dry) milling of the bevel gear teeth of the gear blank K2 using a cutter head 32, 62.

To be able to execute these steps in the cited way, the machining station 30, 60 and the pre-machining station 40, 70 are designed as vertically operating stations and the machining station 30, 60 forms a mechanical functional unit together with the pre-machining station 40, 70.

All machining steps may preferably be executed dry. In this case, the device 20, 50 has to be designed and implemented accordingly.

Figure 2A:
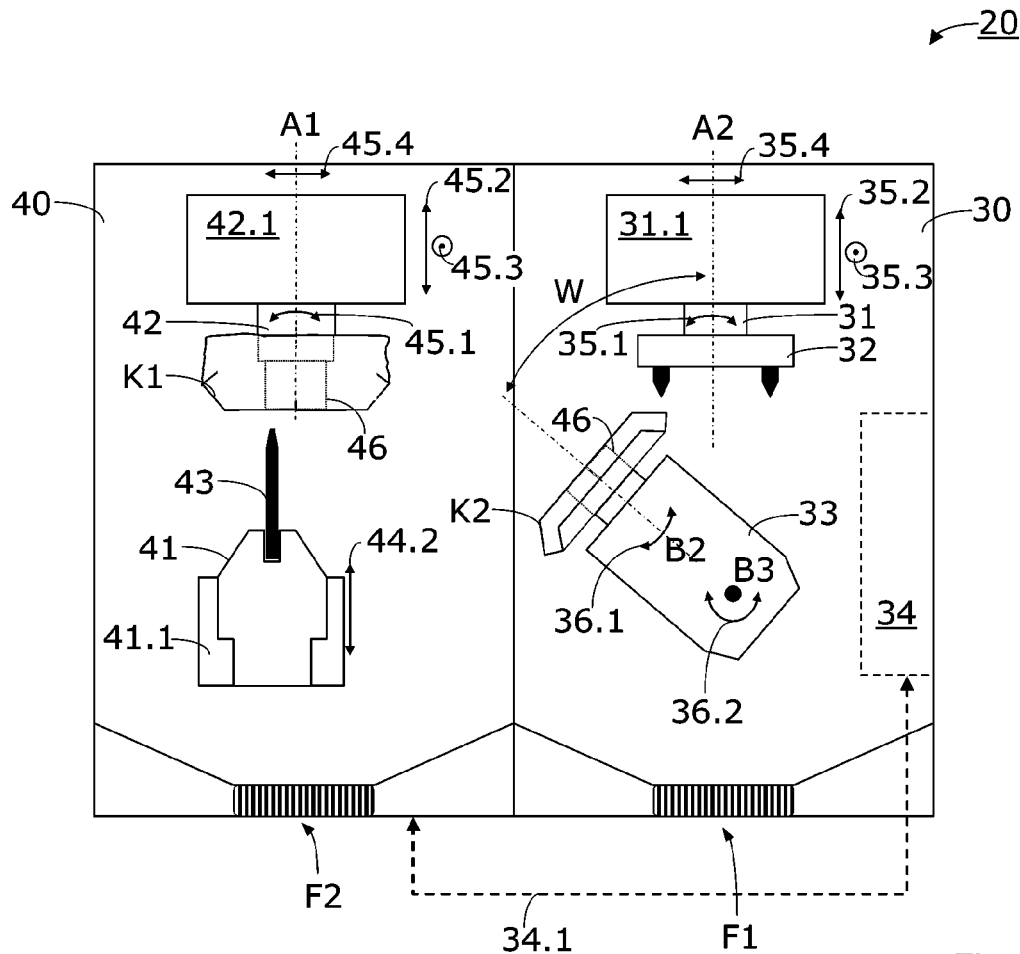
Figure 2B:
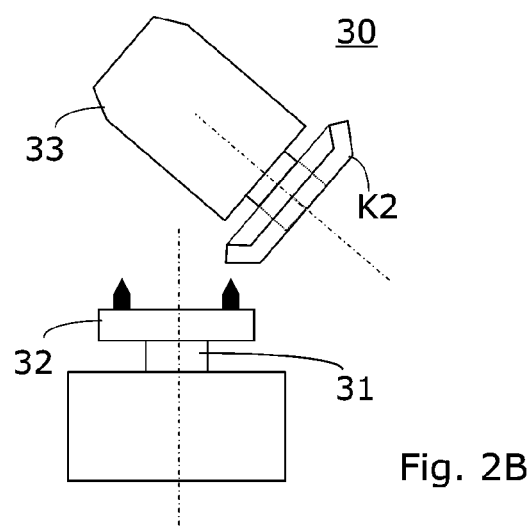
FIG. 2B shows a schematic illustration of an alternate arrangement of the first device.

A first device 20 according to the present invention is shown in FIG. 2. The device 20 is especially designed for use in the green machining of bevel gears and comprises a CNC-controlled machining station 30 for gear cutting a gear blank K2. The machining station 30 has a tool spindle 31 for receiving a gear-cutting tool 32 (such as a dry hobbing cutter) and a workpiece spindle 33 for receiving the gear blank K2.

According to the present invention, the machining station 30 is a vertically operating machining station, in which, during the gear cutting, either the workpiece spindle 33 having the gear blank K2 is situated below the tool spindle 31 having the gear-cutting tool 32, or the workpiece spindle 33 having the gear blank K2 is seated above the tool spindle 31 having the gear-cutting tool 32. According to the present invention, the device 20 additionally comprises at least one vertically operating pre-machining station 40 having a tool retainer 41 and having a workpiece spindle 42 for receiving a workpiece blank K1.

According to the present invention, the machining station 30 forms a mechanical functional unit together with the pre-machining station 40, in which the workpiece blank K1 experiences first green machining in the pre-machining station 40, to then be transferred as the gear blank K2 to the machining station 30 after the first green machining and be cut into a gear there. The machining station 30 has a CNC controller 34, which is indicated in FIG. 2. The machining station 30 and the pre-machining station 40 are linked to one another by control technology, which is indicated in FIG. 2 by the arrow 34.1. This linkage may be performed via a bus or a cable connection. Using another type of interface, such as a wireless connection, to link the CNC controller 34 to the pre-machining station 40 is also conceivable.

Further details of the device 20 shown in FIG. 2 are explained in the following. The pre-machining station 40 has a main rotation axis A1. The workpiece spindle 42 may rotate around this axis A1, as indicated by the double arrow 45.1. Furthermore, the workpiece spindle 42 is seated on a carriage 42.1 and may be displaced in various directions, as illustrated by the arrows 45.2, 45.3, and 45.4. In addition, the tool spindle 41 may have a rotation axis, if a rotation of a tool 43 around its longitudinal axis is desired. In the embodiment shown, the workpiece spindle 41 is seated on a carriage 41.1 and may thus be displaced parallel to an axis 44.2 together with the tool 43. Displaceability along the axis 44.2 is not absolutely necessary, because the tool 43 may also be engaged by displacing the workpiece spindle 42 parallel to the axis 45.2 in the direction of the tool 43.

The machining station 30 has a main rotation axis A2. The tool spindle 31 may rotate around this axis A2, as indicated by the double arrow 35.1. Furthermore, the tool spindle 31 is seated on a carriage 31.1 and may be displaced in various directions, as shown by the arrows 35.2, 35.3, and 35.4. In addition, the workpiece spindle 33 has a rotation axis B2 and a pivot axis B3. The workpiece spindle 33 may be rotated around this axis B2, as indicated by the double arrow 36.1. In addition, the workpiece spindle 33 may be pivoted around the pivot axis B3. In the example shown, the workpiece spindle 33 was pivoted counterclockwise together with the gear blank K2 by an angle W.

The configuration of the axes shown in FIG. 2 is a possible constellation of the axes. The axes of the two machining stations 30, 40 may also be implemented in another form. For example, the workpiece spindle 33 may be situated so it is movable parallel to the axis 35.3. In this case, the carriage 31.1 does not need to be able to be displaced in this direction. Overall, 6 axes are sufficient in each case for the pre-machining station 40 and also for the machining station 30.

In the embodiment shown, the workpiece spindle 33 may not be displaced translationally together with the gear blank K2. Displaceability parallel to the axis 35.2 is not absolutely necessary, because the tool 32 may be advanced by displacing the tool spindle 31 parallel to the axis 35.2 in the direction of the workpiece K2. The workpiece spindle 33 may also be situated on a carriage, however, to obtain further degrees of freedom.

The various axes are numerically controlled axes. The individual movements may thus be numerically controlled by the CNC controller 34. The controller 34 is preferably designed in such a way that all axes are numerically controlled. It is important that individual movement sequences occur in a coordinated way. This coordination is performed by the CNC controller 34.

The device according to the present invention is special and stands out from other known approaches in that the individual machining stations 30, 40 are vertically designed. In addition, the position of the various numerically controlled axes has been selected in such a way that there is the largest possible movement clearance for the machining of the workpiece K1, K2. The following configuration of the individual axes is especially preferred.

Pre-machining station 40: axis A1 runs parallel to the longitudinal axis of the tool 43, the two axes being able to be offset in relation to one another by executing a relative movement parallel to the direction 45.4. Thus, for example, a central hole 46 may be worked out in the workpiece blank K1 using a milling cutter or turning tool 43. The tool spindle 41, including carriage 41.1, is situated below the workpiece spindle 42, including carriage 42.1, and the relative distance to one another may be changed by performing a relative displacement parallel to the axis 45.2. Such a change of the relative distance may be performed in the example shown by a displacement of the carriage 42.1 parallel to the axis 45.2 and/or by a displacement of the carriage 41.1 parallel to the axis 44.2. Preferably, the two axes A1 and the longitudinal axis of the tool 43 may also be offset to one another in depth (perpendicular to the plane of the drawing). For this purpose, the carriage 42.1 may be displaced parallel to the axis 45.3.

Machining station 30: axis A2 runs parallel to the axis B2 (if W equal 0°), but an angle W, which is preferably between 0° and ±90°, may also be set between the axes A2 and B2 by pivoting the workpiece spindle 33. The tool spindle 31, including carriage 31.1, is situated above the workpiece spindle 33 in the embodiment shown and the relative distance to one another may be changed by performing a relative displacement parallel to the axis 35.2. Such a change of the relative distance may be performed in the example shown by a displacement of the carriage 31.1 parallel to the axis 35.2. Preferably, the two axes A2, B2 may be shifted toward one another laterally (in the plane of the drawing). For this purpose, the carriage 31.1 may be displaced parallel to the axis 35.4. Preferably, the two axes A2, B2 may also be moved toward one another in depth (perpendicular to the plane of the drawing). For this purpose, the carriage 31.1 may be displaced parallel to the axis 35.3.

According to one embodiment of the present invention, the workpiece spindle 33 for receiving the gear blank K2 has clamping or gripping means to be able to chuck the gear blank K2. An embodiment in which the clamping or gripping means are designed for automatically chucking the gear blank K2 is especially preferred.

The device 20 may comprise a feed apparatus, which executes the transfer of the gear blank K2 from the pre-machining station 40 to the machining station 30. The feed apparatus may, for example, comprise a horizontal conveyor which accepts the gear blank K2 in the pre-machining station 40 and transports it to the machining station 30. Such a feed apparatus is preferably designed for completely automatic operation, so that the workpiece spindle 42 releases the gear blank K2, for example, by opening clamping or gripping jaws, and the gear blank K2 is moved horizontally along a conveyor line of the horizontal conveyor. The clamping or gripping means of the workpiece spindle 33 grip the gear blank K2 in the area of the machining station 30.

Figure 3A:
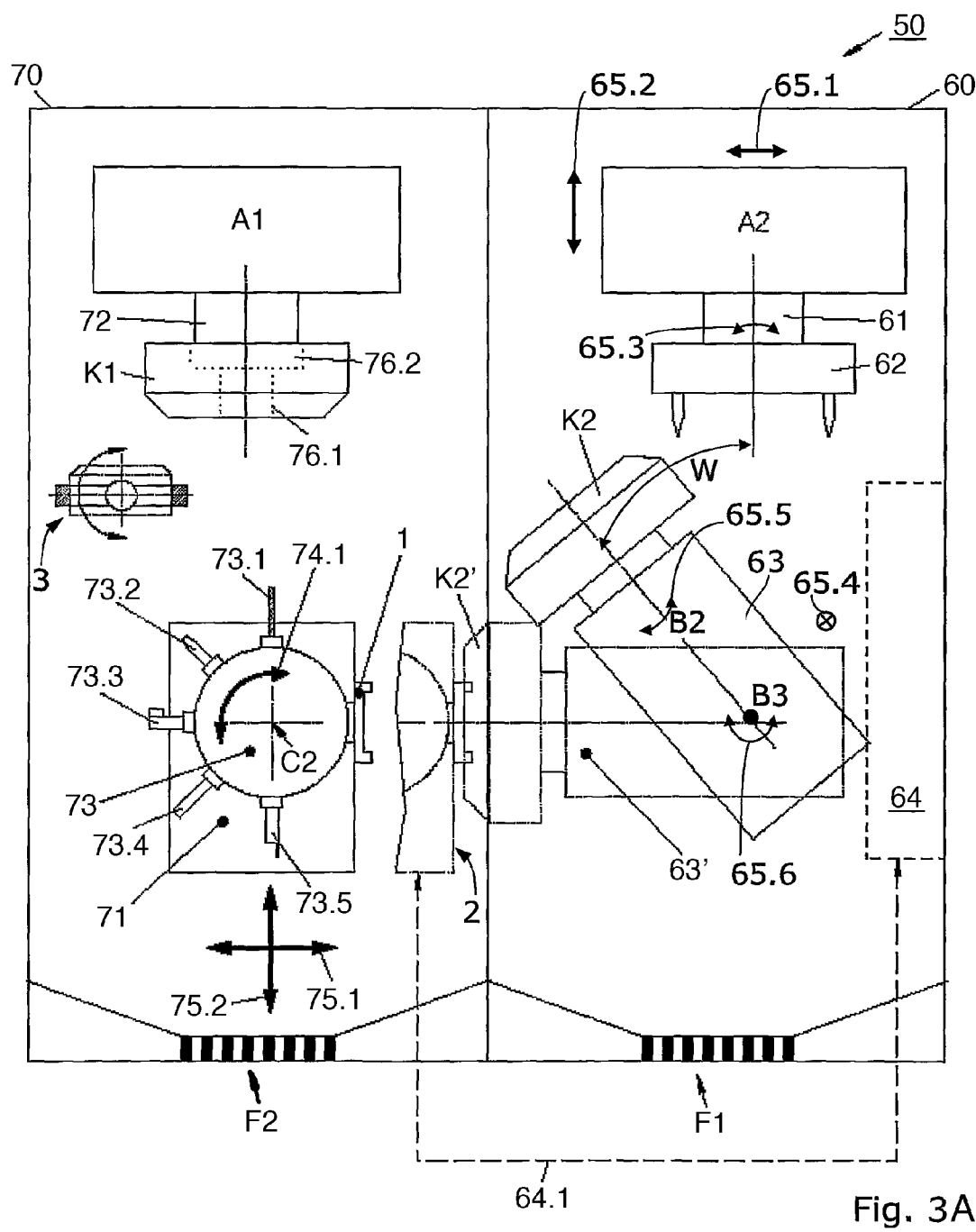
Figure 3B:
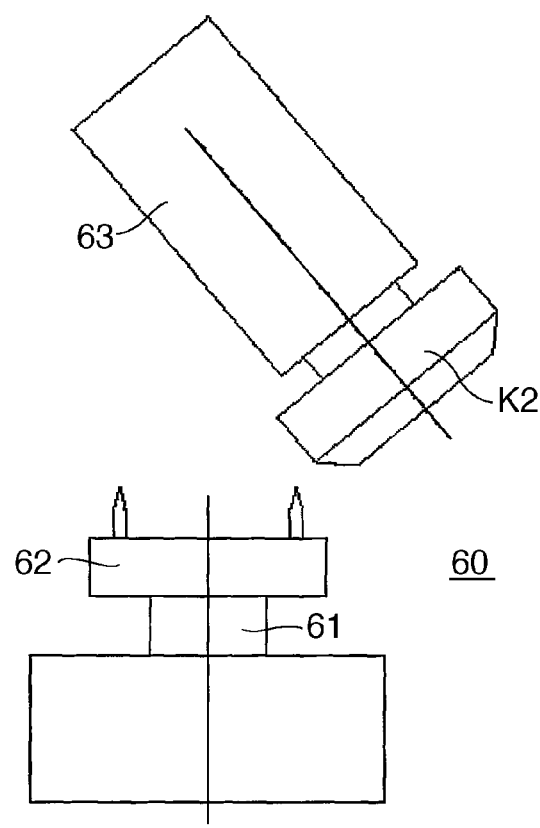
FIG. 3B shows a schematic illustration of an alternate arrangement of the second device.

The tool retainer 41 of the pre-machining station 40 may preferably be equipped with a revolver head, which may receive multiple tools, as described on the basis of the second embodiment (compare FIG. 3). An embodiment in which at least one of the tools which is located on the revolver head may be driven individually is especially preferred.

The pre-machining station 40 may be used for turning, milling, boring, etc. Pre-machining station 40 may also have means for turning over the workpiece blank K1.

A second embodiment of the present invention is shown in FIG. 3. The device 50 is especially designed for use in the green machining of bevel gears and comprises a CNC-controlled machining station 60 for gear cutting of a gear blank K2. The machining station 60 has a tool spindle 61 for receiving a gear-cutting tool 62 and a workpiece spindle 63 for receiving the gear blank K2.

According to the present invention, the machining station 60 is a vertically operating machining station in which the workpiece spindle 63 having the gear blank K2 is situated below the tool spindle 61 having the gear-cutting tool 62 during the gear cutting. The tool spindle 61 having the gear-cutting tool 62 may also be situated below the workpiece spindle 63 having the gear blank K2, however. According to the present invention, the device 50 additionally comprises at least one vertically operating pre-machining station 70 having a tool holder 71 and having a workpiece spindle 72 for receiving a workpiece blank K1.

According to the present invention, the machining station 60 forms a mechanical functional unit together with the pre-machining station 70, in which the workpiece blank K1 experiences first green machining in the pre-machining station 70, to then be transferred as the gear blank K2 to the machining station 60 after the first green machining and be cut into a gear therein. The machining station 60 has a CNC controller 64 which is indicated in FIG. 3. The machining station 60 and the pre-machining station 70 are linked to one another by control technology, as indicated in FIG. 3 by the arrow 64.1. This linkage is implemented identically or similarly to the linkage which was described in connection with FIG. 2.

Further details of the device 50 shown in FIG. 3 are explained in the following. The pre-machining station 70 has a main rotation axis A1. The workpiece spindle 72 may rotate around this axis A1. In addition, the tool carrier 73 has a pivot axis C2, which is perpendicular to the plane of the drawing. The tool carrier 73 may be rotated around this axis C2, as indicated by the double arrow 74.1. In the embodiment shown, the tool carrier 73 is seated on a carriage 71 and may be displaced together with the tools 73.1-73.5 parallel to the axes 75.1 and 75.2. Separate displaceability of the workpiece spindle 72 parallel to the axes 75.1 and 75.2 is not absolutely necessary, but may be provided in an alternative embodiment (see FIG. 2, for example).

In the following, further special features of the device 50 are described. These features may also be used in connection with the device 20 shown in FIG. 2.

The device 50 has an integrated feed apparatus, which executes the transfer of the gear blank K2 from the pre-machining station 70 to the machining station 60. The tool carrier 73 has special clamping or gripping jaws in an area identified by the number 1. After the workpiece blank K1 has been finish machined in the pre-machining station 70, it is transferred to the machining station 60. The finish-machined workpiece blank K1 is also referred to here as the gear blank K2, to be able to differentiate it from the workpiece blank K1. In a first step, the tool carrier 73 is moved by the carriage 71 parallel to the axis 75.2 toward the gear blank K2 (i.e., the relative distance is reduced), which is still chucked on the workpiece spindle 72 at this moment. For the removal and transfer, the gear blank K2 is accepted by the clamping or gripping jaws identified by 1 in that these clamping or gripping jaws engage in a (central) hole 76.1 of the gear blank K2. Before this occurs, the clamping or gripping jaws are moved from the "3 o'clock position" (in FIG. 3) into a "12 o'clock position". As soon as the clamping or gripping jaws have grasped the gear blank K2, the gear blank K2 is released by the workpiece spindle 72. The tool carrier 73 now rotates (preferably clockwise) from the "12 o'clock position" into the "3 o'clock position" shown in FIG. 3 and the carriage 71 moves, as far as necessary, in the direction of the workpiece spindle 63. This position of the tool carrier 73 is schematically indicated at the position marked by 2 in FIG. 3.

In the following step, the workpiece spindle 63 is rotated into a "9 o'clock position". The embodiment shown is preferred, in which no displaceability parallel to the axis 75.1 is provided for the workpiece spindle 63, but rather in which the transfer occurs in that the carriage 71 may be displaced to the right and left parallel to the axis 75.1.

The clamping or gripping jaws of the workpiece spindle 63 now engage from the rear in a (central) hole 76.2 of the gear blank K2. In this transfer position, the gear blank is identified by K2' and the workpiece spindle by 63'. As soon as the clamping or gripping jaws of the workpiece spindle 63' close, the gear blank K2' is released by the clamping or gripping jaws 1 of the tool spindle 73. The workpiece spindle 63 may now be rotated back from the transfer position into a machining position (for example, by the angle 90°-W), and the machining using the gear-cutting tool 62 may begin.

Optionally, the device 50 may have means for turning over the workpiece blank K1. These means are schematically indicated in FIG. 3 and are identified by the reference sign 3. So as not to interfere with the overall illustration in FIG. 3, the means 3 together with the chucked workpiece blank K1 are shown in a smaller scale. It is indicated by a double arrow that the workpiece blank K1 may be turned over by the means 3. It is important that the means 3 are situated and executed in such a way that they allow the workpiece blank K1 to be turned over together with (in interplay with) the workpiece spindle 72.

The machining station 60 may, for example, have the following axial constellation having a total of 6 axes: pivot axis (A2) 65.3, two linear axes 65.1 and 65.2, as well as a workpiece pivot axis (B2) 65.5, swivel axis (B3) 65.6, and a linear axis 65.4 (perpendicular to the plane of the drawing). It is obvious that there are also other axial constellations having a total of 6 axes which are suitable.

In the embodiment shown, the tool carrier 73 has multiple tool holders. Five tool holders are equipped with tools 73.1-73.5 in the example shown. The workpiece carrier 73 is preferably implemented in such a way that at least one of the tool holders is provided with a spindle head, to be able to drive the corresponding tool individually. The tools 73.1 may, for example, be a drill or a milling head, which may be put into rotation around its longitudinal axis. The tools 73.2 and 73.3 may be cutter heads or turning tools, for example, which are each chucked permanently in a tool holder of the tool carrier 73. The tools 73.3 and 73.5 may be deburring heads or the like.

Both embodiments may be modified and adapted appropriately to the framework conditions.

Thus, for example, the device 20 or 50 may also be used for deburring. There are two different approaches. Either the deburring is executed after the pre-machining, for example, after step 104 in FIG. 1. In this case, the deburring occurs in the pre-machining station 70.

Or the deburring is executed after the bevel gear milling, for example, after step 106. In the latter case, the workpiece spindle 63 is rotated counterclockwise around the axis B3 to allow machining of the gear blank K2 using a deburring tool on the tool carrier 73. In this case, the deburring occurs through interaction of the pre-machining station 70 and the machining station 60.

A device which is distinguished in that the machining station comprises a CNC controller which is designed in such a way that the machining station is operable either autonomously or as a functional unit together with the pre-machining station is especially preferred. This makes it possible to operate the machining station alone and to expand it as needed by adding the pre-machining station and/or further stations. The advantage of the fact that there is only one CNC controller, which is located in the machining station, or which is designed for operation with the machining station, is seen in that the pre-machining station may thus be implemented more cost-effectively. This cost savings results primarily because the pre-machining station does not require its own CNC controller. In addition, the linkage of the two stations is much simpler and the coordination of the individual movement sequences of the device is simpler.

To be able to operate machining station and pre-machining station jointly, as provided in the present invention, the pre-machining station is connectable mechanically and by control technology to the machining station using add-on connections. It is made possible by the control technology connection for the CNC controller of the machining station to numerically control axes of the pre-machining station and to coordinate the individual movement sequences. A precise transfer from the pre-machining station to the machining station using a horizontal conveyor, or by the integrated feed apparatus shown in FIG. 3, is made possible by the mechanical connection of the two stations. The collection devices F1, F2 for chips may also be combined with one another by the mechanical connections of the two stations in such a way that the chips may be removed rapidly and without problems to the rear.

Preferably, the pre-machining station comprises its own drives, which are all controllable by the CNC controller. Thus, the pre-machining station and the machining station may be used synchronously. This allows at least partially synchronous green machining of a workpiece blank K1 in the pre-machining station and gear cutting of a gear blank K2 in the machining station.

An embodiment in which the machining station is designed for dry milling a bevel gear is especially preferred.

According to the present invention, tools made of high-performance steel, hard metal, ceramic, or cermet (combination of metal and ceramic), each having a suitable hard material coating, are used for machining the bevel gear teeth.

It is seen as an advantage of the present invention that more than one workpiece may always be machined in the machine tool. It is thus more or less a very compact manufacturing line, which may be implemented in an extremely small space and made available for reasonable prices by special measures, however.

Such a compact manufacturing line has higher throughput than the machine tool of the prior art cited at the beginning, for example (compare EP 0 832 716 B1).

What is claimed is:

1. A device for use in the green machining of bevel gears, having a Computer-Numerically-Controlled (CNC) machining station for gear cutting bevel gear teeth into a gear blank, the machining station having a first tool spindle for receiving a gear-cutting tool for cutting the teeth, which tool is a rotary cutter head, and a first workpiece spindle for gripping and rotating the gear blank, wherein during the gear cutting in the machining station, the first workpiece spindle having the gear blank is situated below or above the first tool spindle having the gear-cutting tool, the device additionally has at least one pre-machining station having a tool holder and a second workpiece spindle for receiving a workpiece blank, the device characterized in that the machining station forms a mechanical functional unit together with the pre-machining station, in which unit the workpiece blank experiences first green machining in the pre-machining station while being chucked in the second workpiece spindle, to then be transferred after the first green machining as the gear blank to the machining station, and have the bevel gear teeth be cut into the gear blank at the machining station to form the bevel gear, and in that the transfer of the gear blank is from the second workpiece spindle to the first workpiece spindle via movement of the tool holder, including rotation of the tool holder and gear blank, between a position where the gear blank is received by the tool holder from the second workpiece spindle and a position where the gear blank is received by the first workpiece spindle from the tool holder, and in that the machining station and the pre-machining station are linked to one another by control technology configured to control the device to perform the first green machining, the transfer, and the bevel gear teeth cutting.

2. The device according to claim 1, characterized in that the machining station comprises a CNC controller of the control technology and the machining station (30; 60) is operable either autonomously or as a functional unit together with the pre-machining station.

3. The device according to claim 2, characterized in that the machining station and the pre-machining station comprise individual drives, which are all controllable by the CNC controller, to thus be able to execute at least partially synchronous first green machining of the workpiece blank and gear cutting bevel gear teeth into the gear blank.

4. The device according to claim 2, characterized in that the pre-machining station is connectable using add-on connections to the machining station mechanically and by the control technology in such a way that the first green machining is controllable by the CNC controller of the machining station.

5. The device according to claim 1, characterized in that the device comprises a feed apparatus, which executes the transfer of the gear blank from the pre-machining station to the machining station.

6. The device according to claim 1 characterized in that, in the pre-machining station, the tool holder includes, in addition to a machining tool, gripping jaws for gripping the gear blank.

7. The device according to claim 1 characterized in that the tool holder of the pre-machining station is equipped with at least one of a milling tool, or a turning tool, to machine the workpiece blank received in the second workpiece spindle of the pre-machining station.

8. The device according to claim 1, characterized in that the tool holder of the pre-machining station comprises a tool carrier having a rotatable spindle head, to be able to drive a tool individually.

9. The device according to claim 1, characterized in that a collection device for chips is provided in each case below the machining station and below the pre-machining station.

10. The device according to claim 9, wherein the chip collection devices facilitate the removal of the chips.

11. The device according to claim 1, wherein the tool holder is pivotable about an axis between a position wherein the tool holder can receive the gear blank from the second workpiece spindle to a position wherein the transfer of the gear blank from the tool holder to the first workpiece spindle is able to occur.

12. The device according to claim 11, wherein the bevel gear teeth cutting operation is a dry milling operation.

13. The device according to claim 1, characterized in that the device comprises a tool for deburring the gear blank.

14. The device according to claim 1, characterized in that the tool holder comprises a deburring tool for deburring the gear blank.

15. The device according to claim 1, characterized in that both the pre-machining station and also the machining station each have six axes, which are all controllable by a single CNC controller of the control technology.

* * * * *

UNITED STATES PATENT AND TRADEMARK OFFICE
CERTIFICATE OF CORRECTION

Page 1 of 1

PATENT NO. : 8,151,437 B2
APPLICATION NO. : 11/815995
DATED : April 10, 2012
INVENTOR(S) : Hartmuth Müller et al.

It is certified that error appears in the above-identified patent and that said Letters Patent is hereby corrected as shown below:

ON THE TITLE PAGE:

Item (75) Inventors name should read as follows:

Burkhard Scheider, Hückeswagen (DE)

Signed and Sealed this
Seventh Day of August, 2012

David J. Kappos
*Director of the United States Patent and Trademark Office*